(No Model.)

W. H. SWEENEY.
Coffee Pot.

No. 237,783. Patented Feb. 15, 1881.

ATTEST:
Julian A. Hurdle,
S. A. Brown.

INVENTOR:
William H. Sweeney
By his Atty,
Burke, Fraser, Connett.

UNITED STATES PATENT OFFICE.

WILLIAM H. SWEENEY, OF NEW YORK, N. Y.

COFFEE-POT.

SPECIFICATION forming part of Letters Patent No. 237,783, dated February 15, 1881.

Application filed May 26, 1880. (No model.)

*To all whom it may concern:*

Be it known that I, WILLIAM H. SWEENEY, a subject of the Queen of Great Britain, residing in the city, county, and State of New York, have invented certain Improvements in Coffee-Pots, of which the following is a specification.

This invention relates to that class of coffee-pots in which the ground coffee is placed in a filter in the pot and boiling water is poured over it. The water percolates through the mass of coffee and eventually falls into the pot through the foraminous bottom of the filter.

Filtering-pots, as above described, have been provided with perforated distributing-plates, some of which have a concave and some a level or horizontal surface, the object being to prevent the force of the water, when poured in, from washing through the finer particles or dust of the coffee and rendering it "muddy." They are also intended to distribute the water and cause it to act equally upon the coffee at all points. In a pot where a concave distributing-disk is employed the stream of water is apt to pass through at the center, and where a flat or level plate is used it is apt to pass through at the point where the stream impinges.

My invention relates to an improved form of distributing-plate, in which the perforations are arranged in a circle concentric with the axis of the pot, and in a depressed concentric trough, all as will be more fully hereinafter set forth.

Figure 1:
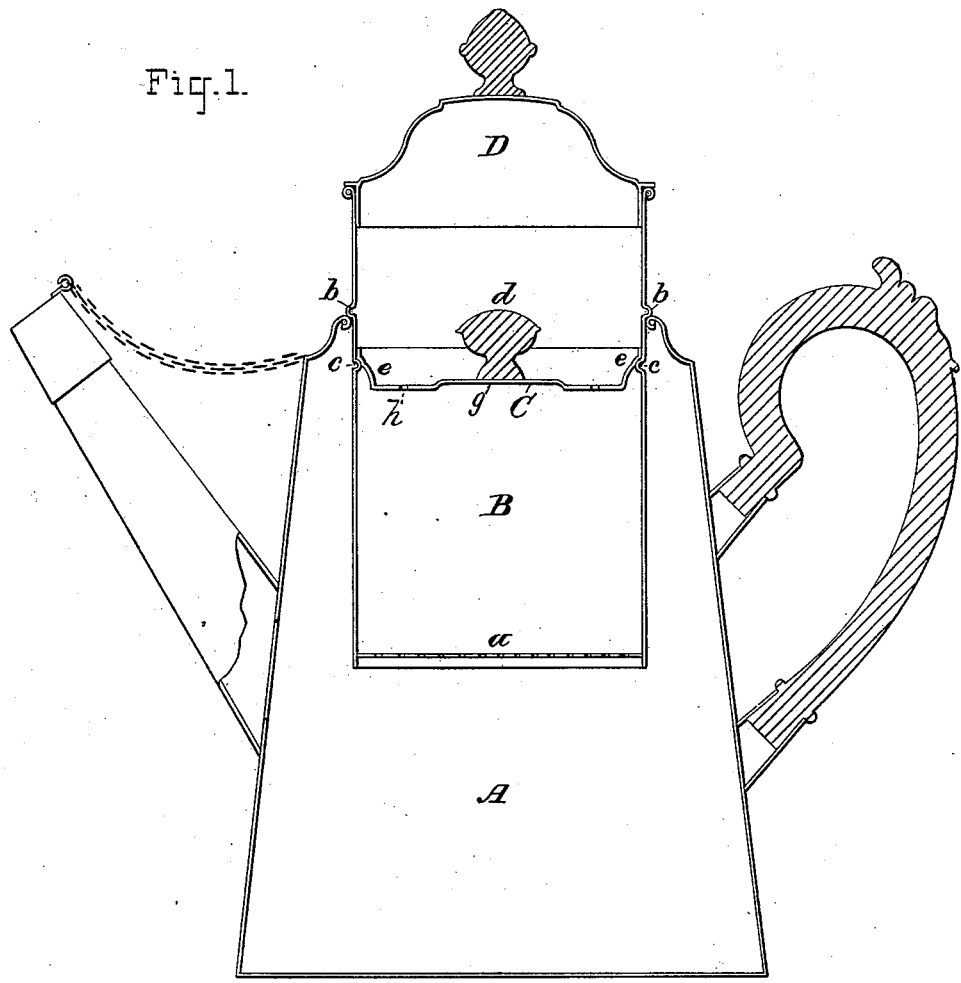
Figure 2:
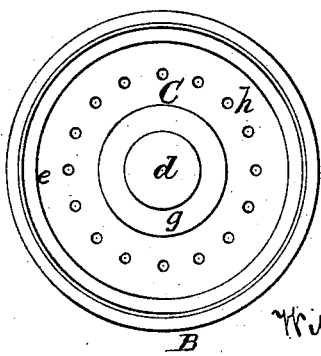

In the drawings, Figure 1 is a vertical mid-section of the pot and filter, and Fig. 2 is a plan of the filter with the cover removed.

Let A represent an ordinary coffee-pot, provided with a handle and spout in the usual way.

B is a filtering-vessel, provided with a perforated metal or gauze bottom, *a*, of the usual or any good construction. This vessel is provided, also, with an external bead, *b*, to rest upon the margin of the opening in the top of the pot, so that the vessel B may only descend a given distance into the pot, and an internal bead or ledge, *c*, to support a distributing disk or plate, C. This plate is stamped out of sheet metal in the form shown, and provided with a large central knob, *d*, whereby it is handled. This handle is attached to a raised central boss, *g*, which is surrounded by a concentric depression, *h*, the flat bottom of which is perforated, as shown. At the margin of the plate the edge is upturned to form a flange, *e*, that forms the outer margin of the depression *h*, and provides, also, a rim to rest upon the bead *c* in the vessel B. The trough-like character of the depression *h* causes the water, when poured in, to flow around and distribute itself evenly as it passes through the perforations. The large convex knob *d* serves as a deflector to scatter the stream poured upon it.

The filtering-vessel B is preferably arranged to project above the pot A, as shown in Fig. 1; but it may be inclosed entirely within the pot. By this construction, however, I am enabled to get a deep water-space above plate C, and at the same time avoid sinking the filter too low in the pot.

The cover or lid D of the filter serves also as a lid for the pot in case it be desired to use the latter without a filter.

Having thus described my invention, what I claim as new, and desire to secure by Letters Patent, is—

The combination, with the pot A and filtering-vessel B, of the distributing-plate C, having a central boss or elevation, *g*, an annular depression, *h*, perforated as shown, an elevated rim, *e*, and a knob, *d*, all arranged as and for the purposes set forth.

In witness whereof I have hereunto signed my name in the presence of two subscribing witnesses.

WILLIAM H. SWEENEY.

Witnesses:
HENRY CONNETT,
ARTHUR C. FRASER.